J. JOHNSON.
CHECK VALVE.
APPLICATION FILED OCT. 4, 1910.
1,004,654.
Patented Oct. 3, 1911.
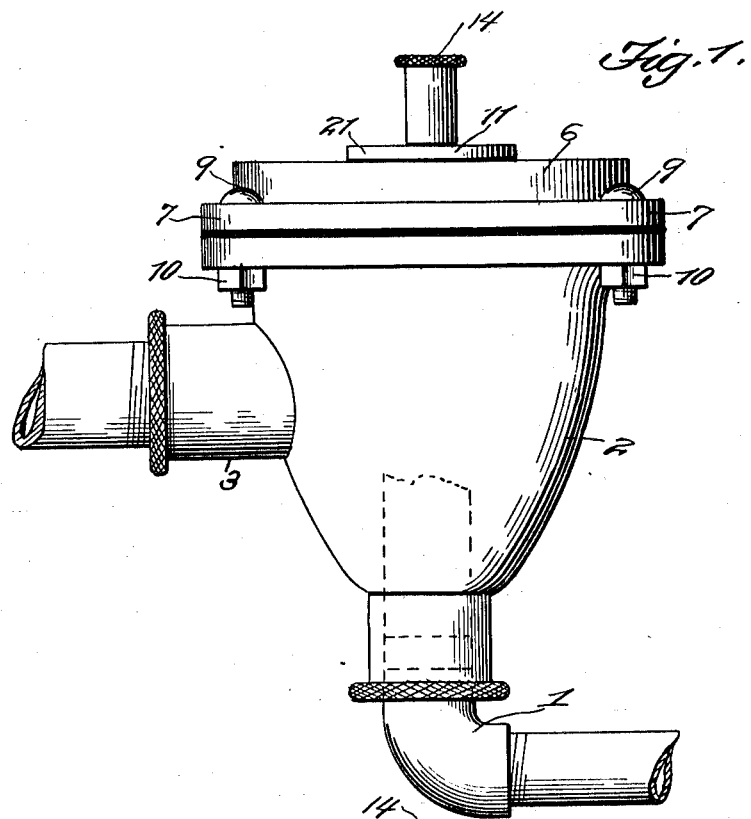
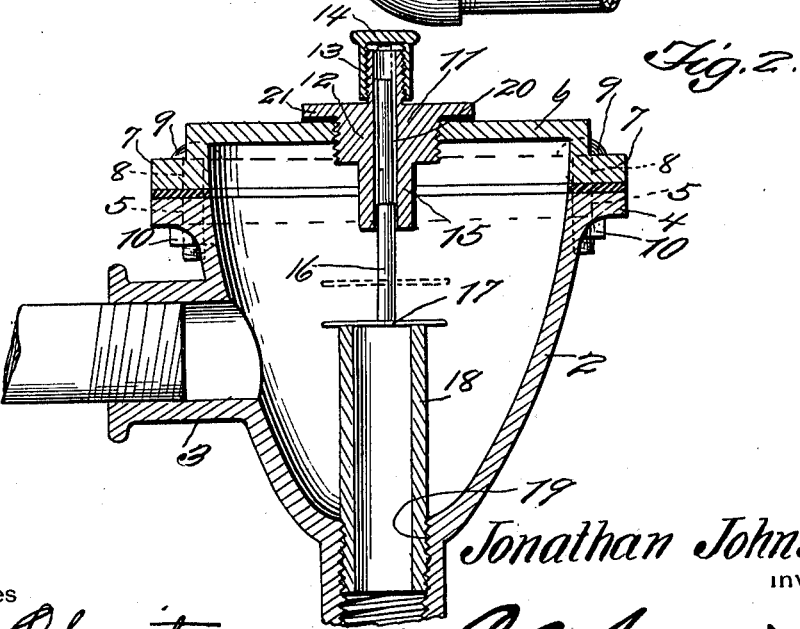
Jonathan Johnson,
inventor
Witnesses
by C. A. Snow & Co.
Attorneys

UNITED STATES PATENT OFFICE.

JONATHAN JOHNSON, OF LOWELL, MASSACHUSETTS.

CHECK-VALVE.

1,004,654.  Specification of Letters Patent.  Patented Oct. 3, 1911.

Application filed October 4, 1910. Serial No. 585,279.

*To all whom it may concern:*

Be it known that I, JONATHAN JOHNSON, a citizen of the United States, residing at Lowell, in the county of Middlesex and State of Massachusetts, have invented a new and useful Check-Valve, of which the following is a specification.

This invention belongs to the art of valves, and it more especially relates to a new and useful check valve, which may be utilized in connection with the installation of water distribution, upon boilers and the like.

The invention in its broadest aspect aims to provide a check valve including novel features of construction.

Another feature of the invention is to provide a gravitating member for closing the valve, the same being open when under pressure.

Another object of the invention is the provision of means, whereby the movement of the valve may be varied, when the same is in the act of being opened.

In the drawings, however, there is only disclosed one particular form of the invention, but in practical fields this form may require slight alterations, to which the applicant is entitled, provided the alterations are comprehended in the appended claims.

Other features and combinations of parts will hereinafter be set forth, shown in the drawings, and claimed.

In the drawings, Figure 1 is a side elevation of the check valve. Fig. 2 is a vertical sectional view through the check valve, showing the valve in two different positions in dotted lines.

In regard to the drawings, 1 represents an elbow, which may be connected to any suitable boiler or pipe (not shown). This elbow may be connected to any hydraulic, steam, or compressed air system. Connected to the elbow by threads is a valve casing 2, of a conical or cone shape. This casing is provided with an offset interiorly threaded portion 3, into which a pipe may be threaded, in order to permit the fluid or air pressure to escape therethrough when the said check valve is raised under pressure. This casing is provided with an annular flange 4, which is provided with bolt receiving apertures 5, the purpose of which will presently appear. A cover or closure 6 is provided for this casing, and is formed with a flange 7, corresponding in shape to the flange of the casing. This flange 7 is also perforated, as shown at 8. The apertures of the flanges of the cover or closure and the casing, when brought into registration, receive the screw bolts 9, to which are threaded the nuts 10. By the provision of the screw bolts 9 and the nuts 10, as well as the apertures of the said flanges, the cover or closure is connected securely to the said casing.

Threaded into the cover or closure, is the sleeve 11, the larger exteriorly threaded portion 12 of which is threaded into the said cover or closure. The smaller exteriorly threaded portion 13, has threaded thereon the cap 14, the purpose of which will be hereinafter more fully set forth. Projecting from the larger exteriorly threaded portion 12 is a reduced portion 15, into which the stem 16 of the check valve 17 extends, when the check valve is open when under pressure. When the check valve 17 is closed, the stem 16 only extends part way into the hollow portion of the reduced portion 15 of the sleeve. The check valve 17 coöperates with the upper extremity of the short tubular pipe 18, the lower portion of which is threaded as at 19. This threaded portion 19 is connected to the lower part of the said casing, as shown in Fig. 2 of the drawings. This hollow tubular member or pipe, when threaded into the casing as shown in Fig. 2, nearly meets the end of the said elbow 1. However, there is a sufficient amount of space or clearance left between the adjacent ends of the elbow and the tubular member or pipe 18, in order to allow the tubular member or pipe to be slightly adjusted, in order to vary the movement of the check valve 17. The method of adjusting the tubular member or pipe 18 is only one way of varying the movement of the check valve. Another way for varying the movement of the check valve, consists in adjusting the cap 14, between which and the upper end of the stem 16, a gravitating member or weight 20 is disposed. When the cap 14 is adjusted, it varies the space between the upper end of the stem 16 and the said cap, so that the gravitating member or weight 20 may have a smaller or greater space to move, when the check valve is raised under pressure. Under ordinary conditions, this gravitating member or weight is of sufficient weight to hold the check valve in a closed position, but when the conditions become abnormal, the check valve 17 is raised, and with it the gravitating member or weight 20. When rising, they are limited in their movements by the sleeve 14. When the check valve 17 is raised, the fluid or air passes through the elbow and the tubular member or pipe 18, escaping through the offset interiorly threaded portion of the casing. Thus the steam, hydraulic and air pressure may escape to the atmosphere, or it may be conveyed to other devices.

It will be observed that the sleeve is provided with a flange 21, which abuts against the upper outer face of the closure or top of the valve casing.

From the above description, it will be noted that a novel and efficient check valve is provided, and one which will act properly under ordinary conditions, by the use of the gravitating member or weight, but under abnormal conditions, the weight of the gravitating member is overcome, thus allowing the check valve to open, so that the pressure of steam, air or fluid may blow off through the offset interiorly threaded portion of the casing.

The invention having been set forth, what is claimed as new and useful is:

1. A valve comprising a casing having an inlet and outlet, a tubular member adjustably inserted in the casing inlet, a closure for the casing, a sleeve passing through the closure and having its bore concentric with the tubular member, a valve resting upon the upper end of the tubular member and having its stem slidably received in the bore of said sleeve, a cap adjustably mounted upon the sleeve and closing the upper end of the bore thereof and a cylindrical gravitating member slidably located in the bore of the sleeve and resting upon the upper end of the valve stem.

2. A valve comprising a conical casing having at its lower end an inlet and an outlet in one wall thereof at right angles to the inlet, a removable cover for the upper end of said casing, provided with a central opening therethrough, a tubular member fitting within the casing and secured in the inlet end thereof, a removable sleeve mounted in the opening of the cover and provided with a central bore concentric with the tubular member, a valve resting upon the upper end of the tubular member and having its cylindrical stem slidably mounted in the lower end of the bore of said sleeve, a cap mounted upon the outer extremity of the sleeve and closing the bore thereof, and a clyindrical weight slidably mounted in the bore of said sleeve above the stem of the valve and adapted to normally hold the valve closed, but to permit a vertical movement due to the pressure in the tubular member.

In testimony that I claim the foregoing as my own, I have hereto affixed my signature in the presence of two witnesses.

JONATHAN JOHNSON.

Witnesses:
ETHEL E. LIVINGSTON,
HAVEN G. HILL.

---

Copies of this patent may be obtained for five cents each, by addressing the "Commissioner of Patents, Washington, D. C."